US012567747B2

(12) United States Patent
Sun et al.

(10) Patent No.: US 12,567,747 B2
(45) Date of Patent: Mar. 3, 2026

(54) METHODS TO PROVIDE ELECTRIC POWER FROM RENEWABLE ENERGY EQUIPMENT TO AN ELECTRICAL LOAD

(71) Applicant: SHELL USA, INC., Houston, TX (US)

(72) Inventors: Yin Sun, The Hague (NL); Martijn Lunshof, Amsterdam (NL)

(73) Assignee: SHELL USA, INC., Houston, TX (US)

( * ) Notice: Subject to any disclaimer, the term of this patent is extended or adjusted under 35 U.S.C. 154(b) by 0 days.

(21) Appl. No.: 18/833,480

(22) PCT Filed: Jan. 30, 2023

(86) PCT No.: PCT/EP2023/052106
§ 371 (c)(1),
(2) Date: Jul. 26, 2024

(87) PCT Pub. No.: WO2023/144359
PCT Pub. Date: Aug. 3, 2023

(65) Prior Publication Data
US 2025/0219421 A1       Jul. 3, 2025

(30) Foreign Application Priority Data
Jan. 31, 2022    (EP) .................................... 22154291

(51) Int. Cl.
*H02J 3/36*        (2006.01)
*H02J 3/38*        (2006.01)
(52) U.S. Cl.
CPC .................................... *H02J 3/36* (2013.01);
*H02J 3/38* (2013.01); *H02J 2003/365* (2013.01)
(58) Field of Classification Search
CPC ........... H02J 3/36; H02J 3/38; H02J 2003/365
See application file for complete search history.

(56) References Cited

U.S. PATENT DOCUMENTS 3,242,412  A      3/1966  Diebold
4,517,635  A      5/1985  Kelley, Jr.
           (Continued)

FOREIGN PATENT DOCUMENTS

CN        103457284  A      12/2013
CN        104104102  A      10/2014
           (Continued)

OTHER PUBLICATIONS

International Search Report and Written Opinion received for PCT Patent Application No. PCT/EP2023/052106, mailed on Apr. 21, 2023, 13 pages.

(Continued)

*Primary Examiner* — Carlos Amaya
(74) *Attorney, Agent, or Firm* — SHELL USA, INC.

(57)        ABSTRACT

An HVDC system comprising an AC/DC converter sub-system electrically connected to a renewable energy equipment and a VSC sub-system is provided. A method comprises operating the renewable energy equipment to function as a voltage source to energize an HVDC link between the AC/DC converter sub-system and the VSC sub-system; operating the VSC sub-system as a voltage source to energize an electrical load electrically connected thereto; if it is determined the power production rate of the renewable energy equipment is not within a designated parameter, operating the equipment to follow the VSC sub-system such that controlling the AC electric power output influences the power production rate. If it is within the designated parameter, operating the VSC sub-system to follow the renewable energy equipment such that the VSC sub-system adjusts the properties of its AC electric output to match the properties of the electric power generated by the renewable energy equipment.

15 Claims, 5 Drawing Sheets

(56) References Cited

U.S. PATENT DOCUMENTS

| | | | |
|---|---|---|---|
| 7,061,360 | B2 | 6/2006 | Richardson et al. |
| 8,000,840 | B2 | 8/2011 | Nielsen |
| 8,305,778 | B2 | 11/2012 | Jiang-Häfner |
| 9,197,068 | B2 | 11/2015 | Nuqui et al. |
| 9,303,325 | B2 * | 4/2016 | Hinatsu .................. H02J 3/381 |
| 9,379,633 | B2 | 6/2016 | Jiang-Häfner |
| 9,692,311 | B2 | 6/2017 | Kim et al. |
| 9,853,562 | B2 | 12/2017 | Dorn et al. |
| 9,960,603 | B2 | 5/2018 | Dorn et al. |
| 10,566,799 | B2 | 2/2020 | Beekmann et al. |
| 10,763,761 | B2 | 9/2020 | Ding et al. |
| 2013/0279211 | A1 | 10/2013 | Green et al. |
| 2014/0146582 | A1 | 5/2014 | Gupta et al. |
| 2020/0240166 | A1 | 7/2020 | Graner |
| 2021/0047997 | A1 | 2/2021 | Abeyasekera |

FOREIGN PATENT DOCUMENTS

| | | | |
|---|---|---|---|
| CN | 105846455 | A | 8/2016 |
| CN | 106816887 | A | 6/2017 |
| CN | 108110799 | A | 6/2018 |
| CN | 108964097 | A | 12/2018 |
| CN | 109217353 | A | 1/2019 |
| CN | 109921450 | A | 6/2019 |
| CN | 110108986 | A | 8/2019 |
| CN | 110611332 | A | 12/2019 |
| CN | 111416337 | A | 7/2020 |
| CN | 111641227 | A | 9/2020 |
| CN | 112787353 | A | 5/2021 |
| CN | 113394819 | A | 9/2021 |
| DE | 102014200464 | A1 | 7/2015 |
| EP | 1596052 | A1 | 11/2005 |
| TW | 201347339 | A | 11/2013 |
| WO | 2009063104 | A1 | 5/2009 |
| WO | 2016158777 | A1 | 10/2016 |
| WO | 2021043912 | A1 | 3/2021 |

OTHER PUBLICATIONS

Bernal-Perez et al., "Wind Power Plant Control for the Connection to Multiterminal HVdc Links", IEEE, 2012, pp. 2873-2879.

Lesnicar et al., "An Innovative Modular Multilevel Converter Topology Suitable for a Wide Power Range", IEEE Bologna PowerTech Conference, Jun. 23-26, 2003, pp. 1-6.

Bernal-Perez et al., "Off-shore Wind Farm Grid Connection Using a Novel Diode-rectifier and Vsc-inverter Based HVdc Transmission Link", IECON, 2011, pp. 1-6.

Singlitico et al., "Onshore, Offshore or in-turbine Electrolysis? Techno-economic Overview of Alternative Integration Designs for Green Hydrogen Production Into Offshore Wind Power Hubs", Renewable and Sustainable Energy Transition, Sep. 1, 2021, vol. 1, 15 Pages.

Li et al., "Probabilistic Sizing of a Low-carbon Emission Power System Considering Hvdc Transmission and Microgrid Clusters", Applied Energy, Dec. 15, 2021, vol. 304.

Tiwari et al., "Prospects of Green Hydrogen Production and Supply From Offshore Renewable Energy: Power-to-x Pathways", International Research Journal of Modernization in Engineering Technology and Science, Aug. 2021, vol. 3, Issue No. 8, pp. 307-315.

Semeraro, "Renewable Energy Transport via Hydrogen Pipelines and Hvdc Transmission Lines", Energy Strategy Reviews, May 8, 2021, vol. No. 35, 8 Pages.

Sun et al., "A Study on Using VSC-HVDC for Fast Restoring Loads after System Contingencies", IEEE, 2019, 5 Pages.

Taieb et al. "Cost Analysis of Electricity Transmission from Offshore Wind Farm by HVDC and Hydrogen Pipeline Systems", IEEE, 2019, pp. 632-636.

Fernández-Guillamón et al., "Offshore Wind Power Integration into Future Power Systems: Overview and Trends", Journal of Marine Science and Engineering, 2019, vol. 7, pp. 1-23.

Becker et al., "System Restoration Using Vsc-hvdc Connected Offshore Wind Power Plant as Black-start Unit", EPE, 2017, pp. 1-8.

Lin et al., "A Kind of Converters Suitable for Large-scale Integration of Wind Power Directly Through HVDC", CSEE, 2014, vol. 34, Issue No. 13, pp. 2022-2030.

Faulkner, "Hybridizing HVDC Transmission With Non-local Energy Storage and Large Dispatchable Loads for Load Leveling", IEEE, 2011, pp. 1-8.

Muyeen et al., "Integration of Hydrogen Generator Into Wind Farm Interconnected HVDC System", IEEE, Jun. 28-Jul. 2, 2009, pp. 1-7.

Andersen, "Hybrid HVDC System for Power Transmission to Island Networks", IEEE, Oct. 2004, vol. 19, Issue No. 4, pp. 1884-1890.

* cited by examiner

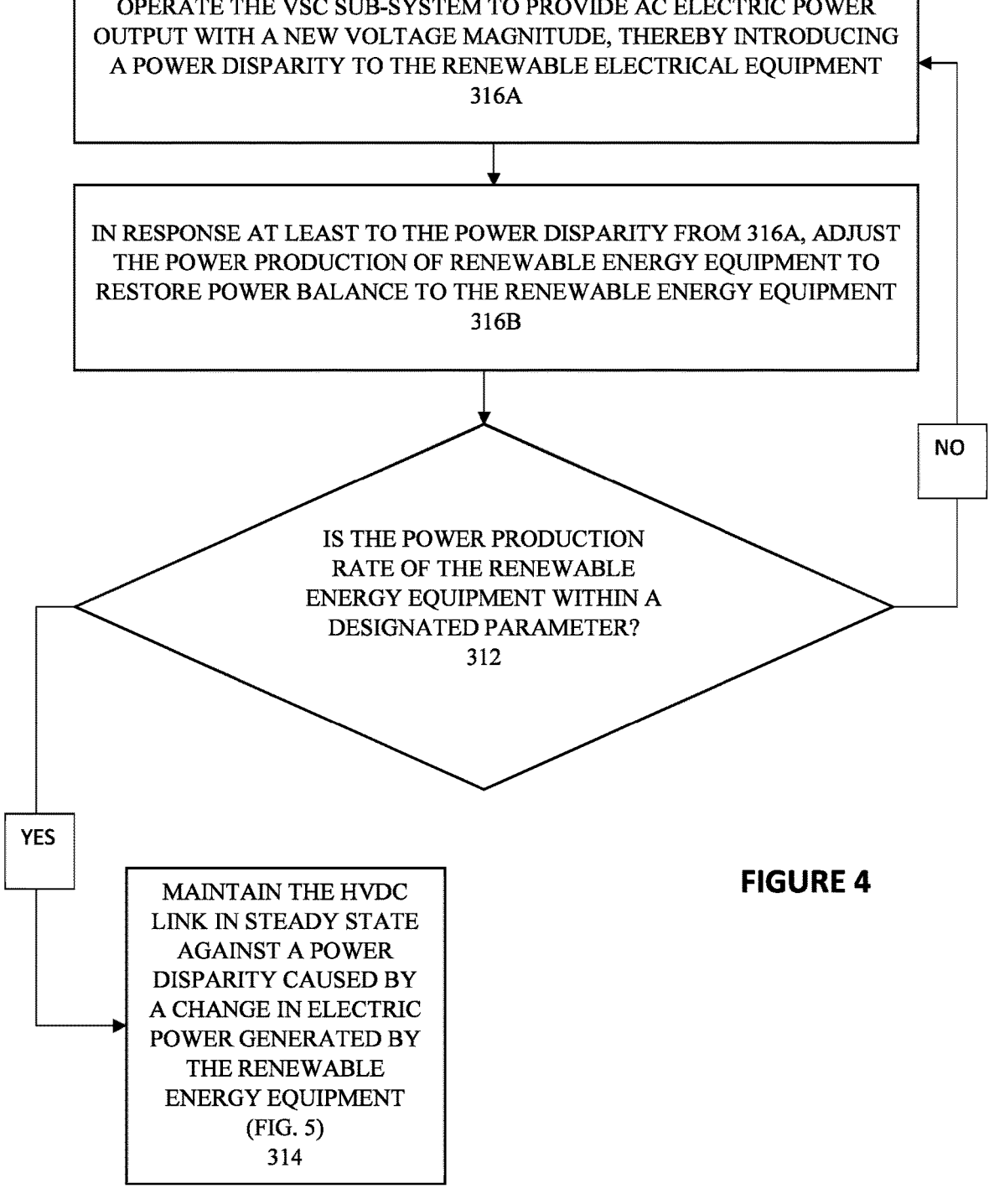

OPERATE THE VSC SUB-SYSTEM TO PROVIDE AC ELECTRIC POWER OUTPUT WITH A NEW VOLTAGE MAGNITUDE, THEREBY INTRODUCING A POWER DISPARITY TO THE RENEWABLE ELECTRICAL EQUIPMENT
316A

IN RESPONSE AT LEAST TO THE POWER DISPARITY FROM 316A, ADJUST THE POWER PRODUCTION OF RENEWABLE ENERGY EQUIPMENT TO RESTORE POWER BALANCE TO THE RENEWABLE ENERGY EQUIPMENT
316B

IS THE POWER PRODUCTION RATE OF THE RENEWABLE ENERGY EQUIPMENT WITHIN A DESIGNATED PARAMETER?
312

NO

YES

MAINTAIN THE HVDC LINK IN STEADY STATE AGAINST A POWER DISPARITY CAUSED BY A CHANGE IN ELECTRIC POWER GENERATED BY THE RENEWABLE ENERGY EQUIPMENT
(FIG. 5)
314

FIGURE 4

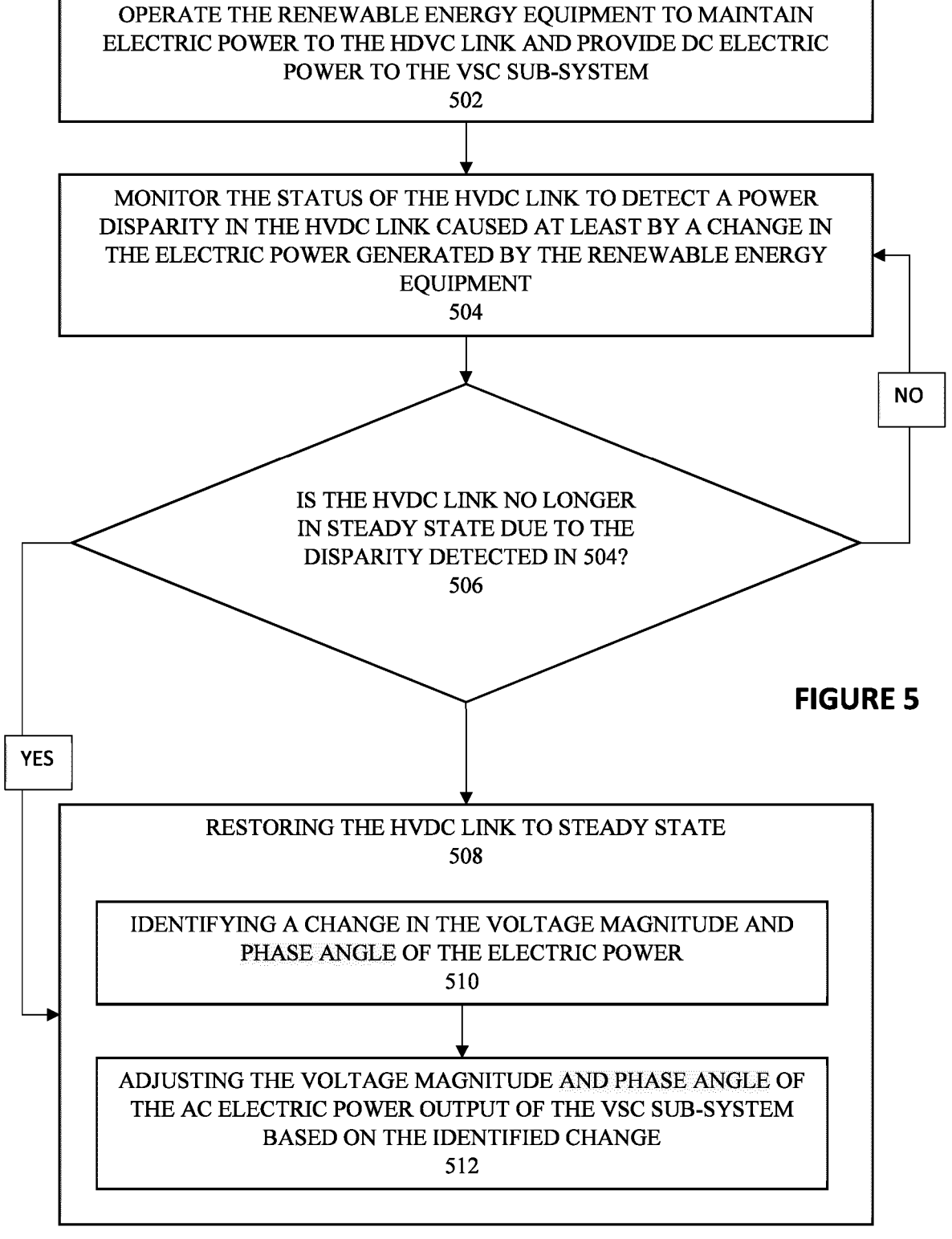

OPERATE THE RENEWABLE ENERGY EQUIPMENT TO MAINTAIN ELECTRIC POWER TO THE HDVC LINK AND PROVIDE DC ELECTRIC POWER TO THE VSC SUB-SYSTEM
502

MONITOR THE STATUS OF THE HVDC LINK TO DETECT A POWER DISPARITY IN THE HVDC LINK CAUSED AT LEAST BY A CHANGE IN THE ELECTRIC POWER GENERATED BY THE RENEWABLE ENERGY EQUIPMENT
504

NO

IS THE HVDC LINK NO LONGER IN STEADY STATE DUE TO THE DISPARITY DETECTED IN 504?
506

FIGURE 5

YES

RESTORING THE HVDC LINK TO STEADY STATE
508

IDENTIFYING A CHANGE IN THE VOLTAGE MAGNITUDE AND PHASE ANGLE OF THE ELECTRIC POWER
510

ADJUSTING THE VOLTAGE MAGNITUDE AND PHASE ANGLE OF THE AC ELECTRIC POWER OUTPUT OF THE VSC SUB-SYSTEM BASED ON THE IDENTIFIED CHANGE
512

METHODS TO PROVIDE ELECTRIC POWER FROM RENEWABLE ENERGY EQUIPMENT TO AN ELECTRICAL LOAD

CROSS REFERENCE TO RELATED APPLICATIONS

This is a National stage application of International Application No. PCT/EP2023/052106, filed 30 Jan. 2023, which claims priority of European Application No. 22154291.3 filed 31 Jan. 2022 which is incorporated herein by reference in its entirety.

FIELD OF THE INVENTION

The present invention relates to methods to provide electric power from renewable energy equipment to an electrical load, particularly at least through use of an HVDC system electrically connected to both for transmission of the electric power.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

Renewable or "green" energy sources, such as electricity generated by photovoltaic panels or wind turbines, has garnered increasing interest in efforts to decarbonize global energy consumption. Also, of great interest is "green" hydrogen which is produced using water electrolysis fed by "green" electricity.

The characteristics of electric power from renewable sources, such as solar or wind, can vary throughout the day, particularly due to the intermittent nature of such sources. The intermittency and other factors have presented challenges to directly interconnect a renewable energy source with electrical loads, particularly largescale electrical loads, such as those with annual power consumption in the gigawatt(s) range. Additionally, the existing power electronics interface utilized in wind and solar application (also known as grid-following type) requires connection to utility power grid for its power production and transmission to energy user. As such, renewable energy equipment that generates energy from renewable sources ("green" energy) typically is connected to a utility power grid as an intermediary for wider distribution of the green energy to the general population served by that utility power grid rather than such green energy being transmitted from the renewable energy equipment directly to one or more electrical consumers, particularly ones with energy demands in the gigawatt range.

Presently, "green" hydrogen production facilities receive the green energy indirectly from a utility power grid system rather than directly from the renewable energy sources themselves. Being dependent on the electric power grid system for the delivery of green electricity has certain drawbacks, such as being subject to interruptions in the electric power grid system, including blackouts and other grid disturbances (e.g. voltage dip, power quality, voltage oscillation etc) and faults. Moreover, grid dependency also results in being subject to the timing and availability of expansion of grid connection and the availability of such grid connection to the locations where the renewable energy equipment is located. In addition, there are inefficiencies related to connections with the electric power grid due to the multiple conversion between alternating current (AC) and direct current (DC) between the flow of electricity from the renewable electricity generator to the electric power grid system and then distributed to electrical consumers.

Moreover, the intermittency of the renewable energy source can be challenging to re-starting a system, such as at the beginning of the day for an electrical consumer that receives its electricity directly from a photovoltaic facility, without power from an electric power grid system. In the absence of power from the electric power grid, a so-called black start needs to be performed to energize the electrical consumer into operation, including controlling both the renewable electricity generator and electrical consumer to match the power generation with power consumption during operation of both the renewable electricity generator and the electrical consumer.

For instance, while U.S. Pat. No. 9,379,633B2 discloses a method to black start an AC network, it does not address the challenges associated with energizing and operating an HVDC system connected to a renewable energy equipment to power an electrical load. Similarly, while U.S. Pat. No. 9,960,603 discloses an installation that includes a rectifier and VSC for transmitting electrical power between two alternating voltage network, it does not address the challenges associated with energizing and operating such an installation. S. Bernal-Perez et al., "Offshore Wind Farm Grid Connection using a Novel Diode-Rectifier and VSC-Inverter based HVDC Transmission Link", IECON, 2011, pages 3186-3191 discloses an installation that includes a rectifier and VSC for transmitting electrical power from offshore wind turbine to a utility power grid in which it is assumed that a synchronous generator maintains the power grid voltage magnitude and angle. However, it does not address the challenges associated with energizing and operating such an installation to transmit electrical power from the offshore wind turbine to an electrical load directly.

Another example is U.S. Pat. No. 10,566,799, which discloses methods to black start a wind farm to produce power to feed into a connected supply network. Likewise, U.S. Pat. No. 10,566,799 does not address the challenges associated with energizing and operating an HVDC system connected to a renewable energy equipment to power an electrical load.

Yet another example is U.S. Pat. No. 9,197,068 which discloses methods for controlling multi-terminal HVDC systems having a plurality of converter stations, including identifying from the measurements a disruption within the HVDC system. U.S. Pat. No. 9,197,068, however, also does not address the challenges associated with energizing and operating an HVDC system connected to a renewable energy equipment to power an electrical load.

U.S. Pat. No. 8,305,778 discloses a method to influence a power generation of at least one adjustable speed generator, where the at least one adjustable speed generator provides power at constant frequency to a local AC bus, the local AC bus being connected via a first voltage source converter to a DC link which in turn is connected via a second voltage source converter to an AC grid. U.S. Pat. No. 8,305,778, however, also does not address the challenges associated with energizing and operating an HVDC system connected to a renewable energy equipment to power an electrical load without a utility power grid connection.

As such, there is still a need for methods to control an HVDC system to provide electric power from a renewable energy equipment directly to an electrical load, including but not limited to without a utility power grid connection.

SUMMARY OF THE INVENTION

The present disclosure describes methods to control an HVDC system to provide electric power from renewable energy equipment to an electrical load, including providing a direct electrical connection between the equipment and the load. The methods disclosed herein can be used to provide point-to-point connection from the renewable energy equipment to transmit electrical power to electrical load as well as other arrangements involving additional terminals beyond point-to-point connections as understood by one of ordinary skill. The presently described methods address challenges to such electrical connection, including the varying and intermittent availability of electricity production, such as electricity generated by wind or solar. Such a direct electrical connection provided by the HVDC system and methods of controlling such HVDC systems described herein enables electrical consumers in general, and particularly large-scale electrical consumers with nominal capacity in the gigawatts (GW) range), to be independent of an utility power grid, whereby grid-independence minimizes grid-related disruptions experienced by the large-scale electrical consumer, such as planned or unplanned black-outs, faults and other grid disturbances. Also, methods and systems described herein enables power to be supplied directly from a renewable energy equipment, thereby allowing for the option to eliminate infrastructure needed to connect to a utility power grid. This, in turn, decouples the operation of a facility receiving power direction from the renewable energy equipment from the availability and capacity of existing and additional grid-infrastructure to implement such grid-connection. Such option for grid-independence enables development of certain locations as renewable energies facilities which locations were previously considered as inaccessible due to the lack of existing utility power infrastructure to allow for distribution of the green energy to end electrical consumers.

Moreover, having the option to be independent of the electric power grid allows the electrical consumers, particularly the large-scale ones, to control and manage its own electrical network to meet the electrical consumption demands, which can lead to improved overall system efficiency and overall production and reduced CAPEX and OPEX. Moreover, a direct electrical connection with renewable electricity generators allows for the option of co-location of the electrical consumer and the renewable electricity generators. Both the option for co-location and/or grid-independence can reduce the footprints and demands on the existing electric power grid system as additional renewable energy equipment and/or electrical consumers, particularly large-scale ones, come online. Without the option for such point-to-point connection with the renewable electricity generators, extensive expansion of the electric power grid would likely be needed to accommodate receiving "green" electricity from additional renewable energy equipment or facilities and distribution to additional consumers. The co-location option extends to being able to build a facility at locations where the renewable electricity generator is available but electric power grid connection is inadequate or unavailable.

Moreover, when the electrical consumer is an electrolyzer, a direct electrical connection between the electrolysis and the renewable electricity generator would likely provide the highest conversion efficiency of renewable energy (such as wind or solar) to hydrogen. As used herein, an electrolyzer has its ordinary meaning, including a system that uses electricity to break water into hydrogen and oxygen in a process called electrolysis.

While the methods and systems for connecting renewable energy equipment to electrical loads described herein enable independence from an electric power grid, they also provide the option to be connected to the grid if such grid-connection is desirable.

Accordingly, the present invention provides a method for providing electric power from a renewable energy equipment to an electrical load. The method comprises:

(a) providing an HVDC system comprising an AC/DC converter sub-system and a VSC sub-system, where the AC/DC converter sub-system comprises at least one AC/DC converter unit, an input electrically connected with the renewable energy equipment, and an output electrically connected with the VSC sub-system, and where the VSC sub-system comprises at least one VSC, an input electrically connected with the AC/DC converter sub-system, and an output electrically connected with at least one electrical load;

(b) determining an initial voltage magnitude and phase angle for electric power to be generated by the renewable energy equipment;

(c) operating the renewable energy equipment to generate electric power having the predetermined initial voltage magnitude and phase angle from step (b) to energize an HVDC link between the AC/DC converter sub-system and the VSC sub-system, thereby providing DC electric power to the VSC sub-system, where the renewable energy equipment generates the electric power at a power production rate;

(d) operating the VSC sub-system to convert the DC electric power to AC electric power output to energize the at least one electrical load, where the AC electric power output has an initial voltage magnitude;

(e) determining whether the power production rate of the renewable energy equipment is within a designated parameter, and if an outcome of the determination is a "no," operating the renewable energy equipment to follow the VSC sub-system such that controlling the AC electric power output of the VSC sub-system influences the power production rate of the renewal energy equipment;

(f) changing the AC electric power output of the VSC sub-system, thereby introducing a power disparity to the renewable energy equipment;

(g) in response to at least the power disparity from step (f), adjusting the power production rate of the renewable energy equipment to restore power balance to the renewable energy equipment; and (h) repeating steps (e) through (g) until it is determined that the power production rate of the renewable energy equipment is within the designated parameter.

Optionally, step (f) can comprise operating the VSC sub-system to provide AC electric power output comprising a new voltage magnitude selected based at least on a desired incremental change to the AC voltage output; and step (g) can comprise operating the renewable energy equipment to generate electric power with a new voltage magnitude and phase angle that correspond to the new voltage magnitude of the VSC sub-system from step (f) to restore power balance to the renewable energy equipment. Suitably, the desired incremental change can be determined based at least on a difference between an actual AC voltage output and a designated AC voltage output of the VSC sub-system.

Suitably, the method can further comprise:

(i) upon determining that the power production rate of the renewable energy equipment is within the designated parameter, operating the VSC sub-system to follow the renewable energy equipment such that a change in electric power generated by renewable energy equipment influences the AC electric power output of the VSC sub-system; and (j) maintaining the HVDC link in steady state in response to a detected power disparity in the HVDC link caused at least by a change in the electric power generated by the renewable energy equipment by operating the VSC sub-system to adjust voltage magnitude of its AC electric power output to correspond to the electric power generated by the renewable energy equipment.

Optionally, step (j) can comprise:

identifying a change in the voltage magnitude and phase angle of the electric power generated by the renewable energy equipment causing the detected power disparity; and adjusting the AC electric power output of the VSC sub-system to restore the HDVC link to steady state by operating the VSC sub-system to provide AC electric power output comprising a new voltage magnitude based on the identified change.

Optionally, the designated parameter can be in a range from −10% to +10%, preferably from −5% to +5%, and more preferably from −1% to +1%, of a power production threshold of the renewable energy equipment. Suitably, the power production threshold can be determined by maximum power point tracking (MPPT).

According to another aspect, there is provided a method for controlling an HVDC system to provide electric power from a renewable energy equipment to an electrical load, in particular an electric load being independent from an electric power grid. The method comprises:

(a) providing an HVDC system comprising an AC/DC converter sub-system and a VSC sub-system, where the AC/DC converter sub-system comprises at least one AC/DC converter unit, an input electrically connected with the renewable energy equipment, and an output electrically connected with the VSC sub-system, and where the VSC sub-system comprises at least one VSC, an input electrically connected with the AC/DC converter sub-system, and an output electrically connected with at least one electrical load; and (b) operating the renewable energy equipment to generate electric power having a voltage magnitude and phase angle that maintain the HDVC link in steady state and provide DC electric power to the VSC sub-system;

(c) operating the VSC sub-system to convert the DC electric power to AC electric power output to provide to at least one electrical load, wherein the AC electric power output comprises a first voltage magnitude;

(d) monitoring status of the HVDC link to detect a deviation from steady state caused at least by a change in the voltage magnitude and phase angle of the electric power generated by the renewable energy equipment; and (e) upon detecting the deviation, restoring the HVDC link to steady state, where the restoring step comprises identifying the change from step (d), and operating the VSC sub-system to convert the DC electric power to AC electric power output comprising a new voltage magnitude selected based on the identified change.

In this respect it is noted that the electrical load as used according to the present invention is preferably independent from an electric power grid. This is different to e.g. U.S. Pat. No. 8,305,778 where an AC grid is used.

Further it is noted that in step (b) of the above method according to the present invention, that change in voltage magnitude and phase angle of electric power generated by the renewable energy equipment is by the renewable energy equipment itself. This, in contrast to for example U.S. Pat. No. 8,305,778, where (see col. 2, line 65-col. 3, line 2) " . . . the invention is based on the idea to modify the power generated by the ASG [Adjustable Speed Generator, used to transform wind energy into electrical power] by modifying the AC voltage in the local AC bus. This modification is done by control of the first voltage source converter.".

Furthermore, it is noted that in step (d) of the above method according to the present invention, power output change of renewable energy equipment is resulted from intermittency nature of natural resources which can either increase or decrease. To the contrary, according to U.S. Pat. No. 8,305,778, only power reduction takes place. See for example col. 3, lines 22-30 of U.S. Pat. No. 8,305,778: "With this method a fast and effective reaction to a fault in AC grid is achieved, whereby reduction of the reference value of the AC voltage in the local AC bus leads to a response of the first voltage source converter to reduce the AC voltage magnitude in the local AC bus. This again leads to a reduction in the power generator by the at least one ASG.".

Furthermore, in step (e) of the above method according to the present invention, restoration of the HVDC link to steady state is achieved via the modification of VSC sub-system output voltage magnitude interfacing the electrical load. This, whilst U.S. Pat. No. 8,305,778 focuses on the control method to counteract such change as a result of natural intermittency of renewable energy that can indicate either increase of decrease of power output.

Optionally, step (d) can comprise continuously monitoring wherein the status of the HVDC link is continuously monitored at a time interval of less than 1 second, preferably less than 0.01 second, and more preferably equal to or less than 1 millisecond (ms), such as in a range from 1 microsecond (μs) to 1 second, preferably from 10 μs to 0.01 second, and more preferably from 50 μs to 1 ms.

Suitably, the HVDC link is in steady state when its operating voltage magnitude is in a range from +/−0.01% to +/−10%, preferably from +/−0.01% to +/−5%, more preferably from +/−0.01% to +/−0.1% of its nominal voltage rating.

Optionally, the at least one electrical load is one or more electrical consumers. Suitably, the one or more electrical consumers can comprise an electrolyzer with a nominal capacity of at least 10 Megawatts, preferably in a range of 10 Megawatts (MW) to 10 Gigawatts (GW). Suitably, the electrolyzer does not receive electric power from a utility power grid to generate hydrogen.

Optionally, the AC/DC converter subsystem (102) is a rectifier sub-system comprising at least one rectifier unit. Suitably, the rectifier sub-system comprises a plurality of rectifier units connected in series and/or the VSC sub-system comprises a plurality of VSCs connected in series.

BRIEF DESCRIPTION OF THE DRAWINGS

FIG. 4 illustrates an embodiment of methods to control a power production rate of a renewable energy equipment providing electric power to an HVDC system (such as one illustrated in FIG. 1) according to various aspects disclosed herein, including the embodiment illustrated in FIG. 3.

FIG. 5 illustrates an embodiment of methods to control an HVDC system (such as one illustrated in FIG. 1) to maintain an HVDC link in steady state according to various aspects disclosed herein.

DETAILED DESCRIPTION OF THE INVENTION

Figure 1:
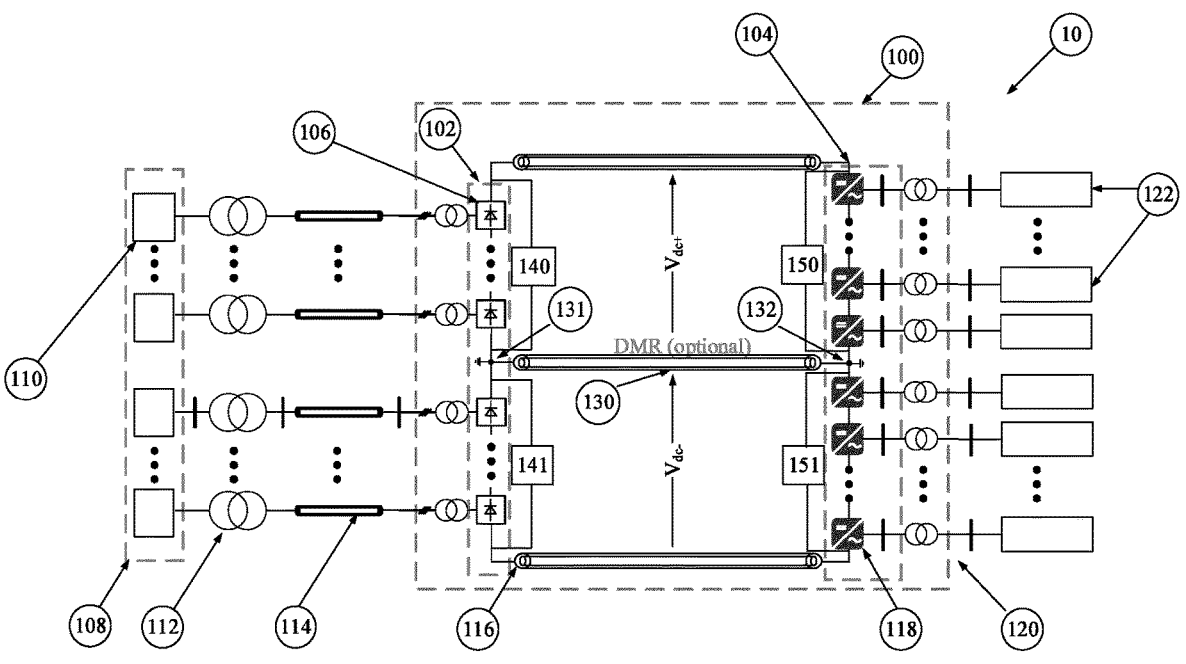
FIG. 1 illustrates one exemplary HVDC system suitable for use with the methods described in the present disclosure.

The present invention will now be described in detail with reference to embodiments thereof as illustrated in the accompanying drawings. References to "one embodiment", "an embodiment" "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Other suitable modifications and adaptations of the variety of conditions and parameters normally encountered in the field, and which would be apparent to those skilled in the art, are within the spirit and scope of the invention.

Although the description herein provides numerous specific details that are set forth for a thorough understanding of illustrative embodiments, it will be apparent to one skilled in the art that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

In addition, when like elements are used in one or more figures, identical reference characters will be used in each figure, and a detailed description of the element will be provided only at its first occurrence. Some features or components of the systems or processes described herein may be omitted in certain depicted configurations in the interest of clarity. Moreover, certain features such as, but not limited to pumps, valves, gas bleeds, gas inlets, fluid inlets, fluid outlets and the like have not necessarily been depicted in the figures, but their presence and function will be understood by one having ordinary skill in the art. Similarly, the depiction of some of such features in the figures does not indicate that all of them are depicted.

Figure 3:
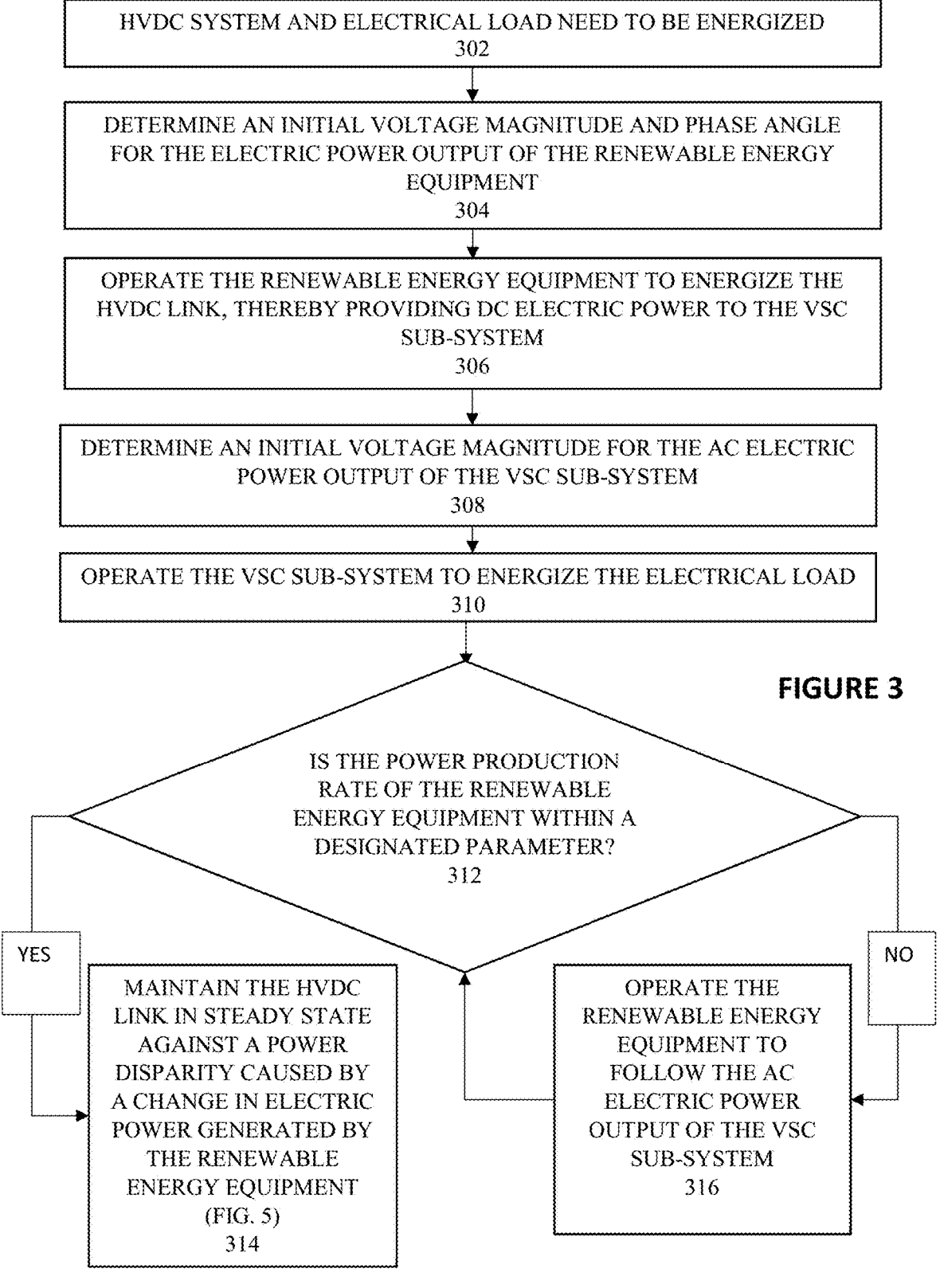
FIG. 3 illustrates an embodiment of methods to energize an HVDC system (such as one illustrated in FIG. 1) according to various aspects disclosed herein.

FIG. 1 and the associated descriptions describe an exemplary system and various optional features (embodiments) of such system that can be used to provide electricity generated by renewable energy equipment directly to an end user. FIGS. 3-5 and the associated descriptions describe exemplary methods and various optional features (embodiments) for use to operate the system (and all its embodiments and optional features) shown in FIG. 1 and as described herein to provide such electricity. As described in the Summary section, the present disclosure enables, amongst other things described herein, a large scale electrical consumer (such as an electrolyzer) to be powered by the renewable energy equipment without receiving electricity from an electrical power grid, although it has the option to do so.

Referring to FIG. 1, HVDC system 100 is depicted, which comprises AC/DC converter sub-system 102 and VSC sub-system 104. In a preferred embodiment, AC/DC converter sub-system 102 is a rectifier sub-system. AC/DC converter sub-system 102 comprises at least one AC/DC converter unit 106, preferably a plurality (two or more) AC/DC converter units 106 connected to each other in series. In preferred embodiments, rectifier sub-system 102 comprises a plurality of rectifier units 106 connected to each other in series. VSC sub-system 104 comprises at least one "voltage source converter" (VSC) 118, preferably a plurality of VSCs 118 connected to each other in series. Although the remaining disclosure refers to "rectifier sub-system 102," it is understood that a rectifier sub-system is a preferred embodiment of an AC/DC converter sub-system and that other suitable devices that convert alternating current (AC) to direct current (i.e., AC/DC converters) can be used as known to one of ordinary skill.

Rectifier sub-system 102 comprises an input (not numbered) that is electrically connected with renewable energy equipment 108 to receive electric power generated therefrom and an output (not numbered) electrically connected with VSC sub-system 104 to provide electric power thereto. VSC sub-system 104 comprises an input (not numbered) electrically connected with rectifier sub-system 102 to receive electric power therefrom and an output (not numbered) electrically connected with at least one electrical load 122 to provide electric power thereto.

Electric power generated by renewable energy equipment 108 is provided to rectifier sub-system 102 through equipment known to one of ordinary skill, such as step-up transformers and power cable, etc. HVDC system 100 can be used with any suitable renewable energy equipment 108 that generates electric power from a renewable energy source and allows for control of the output voltage, angle, and/or frequency of the generated electric power. The renewable energy source can be wind energy, solar energy, biomass, electro-chemical (e.g. fuel cell), or a combination thereof. For instance, renewable energy equipment 108 can comprise wind turbines that include components (such as internal DC link and VSCs) that allow for control of the output voltage, angle, and/or frequency of the generated electric power.

The amount of electric power generated by any given renewable energy source can vary depending on the equipment 108 used in addition to any applicable variability inherent to the renewable energy source itself. For instance, if equipment 108 comprises wind turbines, then the amount of electric power generated depends at least on the size of the turbine and the length of its blades, as well as number of turbines used. Similarly, if equipment 108 comprises PV panels, then the amount of electric power generated depends at least on the size and number of the PV panels.

Referring to FIG. 1, rectifier sub-system 102 of HVDC system 100 is electrically connected to renewable energy equipment 108 to receive the electric power generate by equipment 108. Electric power transmission equipment 112 and 114 known to one of ordinary skill, such as transformers and power lines, including transformers to step voltage up or down as applicable, can be used to provide the electric power from equipment 108 to rectifier sub-system 102. Renewable energy equipment 108 preferably can be operated to function as a voltage source in generating electric power with an initial voltage magnitude and phase angle, which is dependent on the nominal voltage output of equipment 108 and can be determined by one of ordinary skill taking into consideration at least the active power flow and reactive power flow to rectifier sub-system 102. One of ordinary skill in the art would appreciate the relationship between the voltage magnitude of the electric power generated by renewable energy equipment 108 and the active power flowing to rectifier sub-system 102 and be capable of selecting a suitable initial voltage magnitude to achieve the desired active power flow based on the nominal voltage output of equipment 108. Similarly, one of ordinary skill in the art would appreciate the relationship between the phase angle of the electric power generated by renewable energy equipment 108 and the reactive power flowing to rectifier sub-system 102 and be capable of selecting a suitable initial phase angle to achieve the desired reactive power flow in relation to the active power flow.

As used herein, the term "reactive power" refers to the type of electric power flow used to facilitate the transfer of real electric power (i.e., active power) over an alternating current (AC) electric power generation and/or transmission system. In AC circuits, electric power is stored temporarily in inductive and capacitive elements, which results in the periodic reversal of the direction of the flow of electric power. The portion of power flow remaining is the real power or the energy that can be used perform work on a load (e.g., to operate a component or equipment). Conversely, the portion of power flow that is temporarily stored in the form of magnetic or electric fields, due to inductive and capacitive network elements is known as reactive power.

As used herein, "nominal voltage output" has its ordinary meaning including the voltage output value assigned to a component or system (such as equipment 108) to designate its voltage class conveniently (typically assigned by the equipment manufacturer). As used herein, "voltage source" has its ordinary meaning, including a component that can maintain a fixed voltage, ideally independent of the load resistance or the output current. It is understood that such initial voltage magnitude and phase angle can be determined by a computer program or controller of system 100 as described herein.

Any number and/or types of transformers can be used to preferably step-up voltage of the electric power from equipment 108 before it is provided to rectifier sub-system 102. The electrical connection between equipment 108 and rectifier sub-system 102 can be arranged as known by one of ordinary skills. For instance, a unit of equipment 108 (such as one or a selected group of wind turbines or PV panels, depicted as 110 in FIG. 1) can be connected to each rectifier unit 106, such as shown in FIG. 1 or a unit of equipment 108 can be connected to a plurality of rectifier units 106 (not shown).

AC/DC converter sub-system, or preferably rectifier sub-system 102 converts the AC electric power input into direct current (DC) electric power. The output of rectifier sub-system 102 is high voltage DC electric power, which can be due to serial connection of rectifier units 106 if there are two or more and/or the voltage of the AC electric power input being high voltage. As used herein, the term "high voltage" or "HV" refers to voltage of at least 1500V DC voltage.

Preferably, at least one, including all, rectifier units 106 can comprise, including consisting essentially of, a plurality (two or more) rectifiers connected in series, thereby providing two levels of serial connections in which rectifier units 106 themselves are connected with each other in series in arrangements with a plurality of rectifier units 106. It is understood that at least one, including all, rectifier units 106 can comprise (or consist essentially of) one rectifier. Accordingly, rectifier sub-system 102 can have a plurality of (two or more, such as five) rectifier units 106 with at least the following combinations:

(a) at least one unit 106 has one rectifier while the remaining units 106 has two or more rectifiers;

(b) all units 106 has a plurality of (two or more) rectifiers; and (c) all units 106 has one rectifier.

The number and/or size of rectifiers in a rectifier unit 106, and correspondingly the number and/or size of rectifier units 106 in rectifier sub-system 102, are design choices for one of ordinary skills, which can be made based on factors such as ampere rating of HVDC system and DC link voltage. For instance, for an HVDC system with a nominal capacity of 1.2 GW, the rectifier sub-system can comprise 6 rectifier units connected in series, with each rectifier unit comprising 10-12 rectifiers connected in series, where each rectifier is rated for 6.5 kV. As used herein, "rated" voltage has its ordinary meaning, including the maximum voltage at which a component or device (such as a rectifier) can be operated safely. As used herein, "nominal capacity" has its ordinary meaning, including is the intended full-load sustained output of a system or component, if the context refers to an electrical source, or the intended full-load sustained annual consumption of a system or component if the context refers to an electrical load. Nominal capacity is the number registered with authorities for classifying the power output of an electrical source or power consumption of an electrical load, usually expressed in watts, including megawatts (MW).

Suitable rectifiers for use in rectifier unit 106 and rectifier sub-system 102 are preferably unidirectional rectifiers known to one of ordinary skill in the art, and more preferably diode rectifiers. The selected rectifiers preferably allow power to be transported in one direction, which provides benefits of lower weight and less complexity in the circuitry control system when compared to converters that enable bidirectional flow of electric power, such as self-commutated converters. In addition, relatively compact power semiconductors can be used in unidirectional rectifiers.

Referring to FIG. 1, the high voltage DC electric power output of rectifier sub-system 102 is provided to VSC sub-system 104 via an HVDC link 116. HVDC link 116 can comprise one or more one cable circuit or HVDC transmission lines. In the example illustrated in FIG. 1, HVDC link 116 includes three HVDC transmission lines. HVDC link 116 may be or include any suitable combination of direct current cables, direct current overhead lines, direct current cables and direct current overhead lines connected in series, direct current fault-current limiting reactors, or the like, as known to one of ordinary skill.

As understood by one of ordinary skill, there are various suitable configurations for HVDC link 116, including a bi-pole, rigid bi-pole, and monopole. For instance, as shown in FIG. 1, HVDC system 100 can optionally comprise Dedicated Metallic Return (DRM) 130 and grounding points 131 and 132. During operation, either point 131 or 132 can be bypassed (not used) to allow current flow in DMR 130. Under this arrangement of DMR 130 and one ground point (131 or 132), HVDC system 100 effectively becomes a bi-pole configuration with DMR 130. Alternatively, HVDC system 100 can operate without and need not include DMR 130 but still include grounding points 131 and 132. Under this alternative arrangement, HVDC system 100 effectively becomes a rigid bi-pole system. HVDC system 100 can also When the optional DMR 130 is removed and both grounding points 131 and 132 are bypassed, then the HVDC system 100 is effectively a symmetrical monopole system.

Additionally, one can opt to add additional parallel terminals to the existing HVDC system 100 either on the rectifier sub-system 102 side (example 140 and 141 in FIG. 1 or the VSC sub-system 104 side (examples 150 and 151 in FIG. 1), where 140,141,150,151 can comprise at least one or a plurality of rectifier units, thyristor units, VSCs or a combination of thereof.

VSC sub-system 104 converts the HVDC electric power to AC electric power output. Preferably, VSC sub-system 104 preferably can be operated to function as a voltage source in converting DC electric power to AC electric power having an initial voltage magnitude capable of initiating electric power flow to electrical load 122 as can be determined by one of ordinary skill by taking into consideration at least the specifications of HVDC system 100, equipment 108, and load 122. It is understood by one of ordinary skill in the art that the AC electric power output of VSC subsystem 104 also has a phase angle.

In instances where VSC sub-system 104 comprises a plurality of VSCs 118 connected to each other in series, the DC electric power provided to VSC sub-system 104 can be distributed across the VSCs 118 in sub-system 104. Preferably, the DC electric power input may be provided to each of the VSCs 118 in sub-system 104; however, there are circumstances where the DC electric power is provided to a portion or some and not all the VSCs 118, such as equipment failure. In those circumstances, at least one VSC 118 does not receive any DC electric power and is considered to be in bypass mode. The value of AC voltage output of each VSC 118 can be regulated by controlling the amount of DC electric power provided to it according to design choice known to one of ordinary skill.

While VSC 118 can suitably be any self-commutated converter that uses semi-conductor material to convert electric power between alternating and direct currents. For instance, VSC 118 may include, by way of example, several half or full H-bridges or a combination thereof connected in series with a common AC output towards the 122 electrical power load. The semiconductor valves may include branches of gate turn on/turn off semiconductor elements, such as insulated gate bipolar transistors (IGBTs), and diodes in anti-parallel connection with these elements. VSC 118 preferably comprises a modular multi-stage converter, particularly a multi-level modular converter VSC (MMC-VSC), which comprises chains of modules of semi-conductor circuit connected in half or full H-bridge or a combination thereof topology to enable high power quality voltage AC to DC conversion or vice versa, as desired.

In general, a modular multi-stage converter comprises phase modules whose number corresponds to the number of phases of the attached second alternating voltage network. Each phase module is constructed as a three-pole unit and comprises two outer direct voltage terminals and a central alternating voltage terminal. A phase module branch extends between the alternating voltage terminal and each of the direct voltage terminals and comprises a series circuit of two-pole submodules. Each submodule is fitted with an energy store, such as for example a unipolar capacitor, as well as with a power semiconductor circuit arranged in parallel with it. The power semiconductor circuit can, for example, be constructed as an Half-bridge or full-bridge circuit or a combination thereof. In the half-bridge circuit, a series circuit of two power semiconductor switches that can be switched on or off, such as for example IGBTs, IGCTs or the like is provided, where each power semiconductor switch that can be switched on and off has a freewheeling diode connected in parallel with it with the opposite polarity. A first submodule connecting terminal is here connected directly to one pole of the energy store, while the other submodule connecting terminal is connected to the potential node between the power semiconductor switches that can be switched on and off. In a full-bridge circuit, two series circuits each consisting of two power semiconductor switches that can be switched on and off are provided, where one sub module connecting terminal is connected to the potential node between the power semiconductor switches that can be switched on and off of the first series circuit and the second sub module connecting terminal is connected to the potential node between the power semiconductor switches that can be switched on and off of the second series circuit.

The number and/or size of VSCs 118 in VSC sub-system 104 are design choices for one of ordinary skills, which can be made based on factors such as ampere rating of HVDC system and DC link voltage. For instance, for an HVDC system transmitting 1.2 GW, the VSC sub-system can comprise 12 VSCs connected in series.

Referring to FIG. 1, the AC electric power output from VSC sub-system 104 is provided to electrical loads 122. Electrical load 122 can comprise any suitable equipment that uses and/or stores electricity as known to one of ordinary skill. Preferably, electrical load 122 comprises at least one electrolyzer that uses electricity to break water into hydrogen and oxygen in a process called electrolysis, thereby generating hydrogen gas. The hydrogen production capacity is dependent on by the equipment manufacturer. As known by one of ordinary skill, the energy consumption and correspondingly the renewable energy equipment specifications can be determined based on the desired hydrogen production capacity and specifications of the potential electrolyzer equipment. Vice versa, if the renewable energy is a limiting factor, the electrolyzer equipment can be selected and designed based on the renewable energy, as known by one of ordinary skill. For instance, a typical electrolyzer can generate about one (1) kilogram of hydrogen for every 45 to 60 kWh provided to the electrolyzer. When renewable energy equipment is used to generate the energy, a factor in selecting the nominal capacity of the renewable energy equipment typically involves taking into consideration the potential intermittency nature of the renewable energy source. For instance, if wind and/or solar are the renewable energy source, then it may be preferred to adjust the nominal capacity by 50% to account for when electric power may not be generated. This factor, however, would likely change depending on the renewable energy source, such as biofuels. In a scenario where the renewable energy equipment consists essentially of one or more wind turbines, then the renewable energy equipment with a nominal capacity of 200 MW can reasonably be expected to generate about 50 tons of hydrogen per/day (assuming about 50 kWh electric power provided to generate one (1) kg of hydrogen).

The systems and methods described in the present disclosure, including the optional features and various embodiments, enable one or more large-scale electrical consumers 122. For instance, electrical load 122 can comprise at least one, including two, three, four, five, six, seven, eight, nine, ten, or more electrolyzers connected to system 100 and powered by electricity generated by renewable equipment 108. Preferably, each of the at least one electrolyzer has a nominal capacity of at least 10 Megawatts, preferably in a range of 10 Megawatts (MW) to 10 Gigawatts (GW). As noted here and elsewhere in the present disclosure, the electrical consumers of electrical load 122, such as one or more connected electrolyzers do not receive electric power from a utility power grid to generate hydrogen.

Optionally, electrical load 122 can comprise an AC electrical network (such as a utility power grid), or it can comprise an energy storage equipment, such as batteries. The AC electrical network and/or energy storage equipment function as an electrical load by accepting the AC electric power output from VSC sub-system 104, thereby allowing the flow of electricity to continue through system 100. These options can be useful when equipment 108 generates more electric power than what can be used by electrical loads 122 that comprise equipment being powered by system 100 and/or when it can be more cost effective to "sell" the green electricity generated by equipment 108 rather than use or store it for situations where electric power grid connection is feasible. If electrical load 122 comprises an electrical consumer, such as one or more electrolyzers, and it is chosen to also connect the electrical consumer to a utility power grid, it is understood that surplus energy produced by equipment 108 but not used by the connected consumers can be sent to the utility grid (such as described in WO202143912A1), and vice versa, where if the electrical consumer(s) need more energy, it can draw from the utility power grid. However, it is understood that the methods and systems described herein preferably supplies all the electric power to operate one or more electrical consumers as described herein rather than electric power coming from a utility power grid (grid-independence).

Electric power transmission equipment known to one of ordinary skill, such as transformers 120, can be used to provide the electric power from VSC sub-system 104 to electrical load 122. If electrical load 122 comprises equipment that needs electrical power for its operation, any number and/or types of suitable converter transformers 120 can be used to preferably step-down voltage of the electric power from VSC sub-system 104 to an amount appropriate for use by electrical load 122. Suitable converter transformers 120 include those with DC voltage offset withstand capability. It is understood that electrical load 122 can comprise its own converter to convert the AC electric power to DC electric power for use as applicable. If electrical load 122 comprises another AC electrical network, then step-up transformers 120 may be used to provide the electric power at the appropriate voltage to be accepted by the AC electrical network. If electrical load 122 comprises an energy storage equipment then typically step-down transformer is expected to interface to energy storage unit.

While FIG. 1 shows one electric load 122 being connected to and receiving AC electric power output from one VSC 118, it is understood that other configurations are available, including one electrical load 122 connected to two or more VSC 118 to receive AC electric power output therefrom, or two or more electrical loads 122 connected to one VSC 118.

While not shown, it is understood that system 100 can employ a computer program for controlling various components of system 100, such as VSC sub-system 104, and interacting with equipment 108 to control the voltage magnitude and phase of the electricity output from equipment 108. This computer program may be referred to as a controller. For instance, power flowing through HVDC transmission link 116 can be controlled independently of the phase angle between equipment 108 and electrical load 122 by control unit 130. Such control allows for stabilization of HVDC system 100, the source (equipment 108), and electrical load 122 (collectively, electrical network 10) against disturbances due to rapid changes in power and as further described herein.

System 100 can employ any suitable computer program for carrying out applicable steps of the methods described herein when the computer program is executed by a data processor. As used herein, reference to a computer program is intended to be equivalent to a reference to a program element and/or a computer readable medium containing instructions for controlling a computer system to coordinate the performance of the above described method. The computer program may be implemented as computer readable instruction code by use of any suitable programming language, such as, for example, JAVA, C++, and may be stored on a computer-readable medium (removable disk, volatile or nonvolatile memory, embedded memory/processor, etc.). The instruction code is operable to program a computer or any other programmable device to carry out the intended functions. The computer program may be available from a network, such as the World Wide Web, from which it may be downloaded. The various aspects described herein may be realized by means of a computer program respectively software; however, they may also be realized by means of one or more specific electronic circuits respectively hardware. Furthermore, the invention may also be realized in a hybrid form, i.e. in a combination of software modules and hardware modules.

Figure 2:
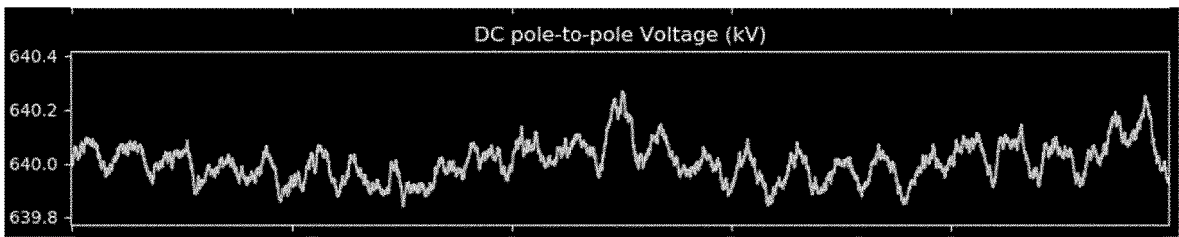
FIG. 2 illustrates a chart of the voltage of an exemplary HVDC link in steady state as described according to various aspects disclosed herein.

One challenge for an electrical network that is dependent on a renewable electrical source for power and independent of an electric power grid, such as network 10, is the intermittent nature of the renewable energy that disrupts the network, from a shutdown when the source, such as wind or sun, is not available, to varying electricity production rate that corresponds to the weather. To maintain HVDC transmission link 116 in steady state, the active power flow into HVDC transmission link 116 should be balanced, meaning the active power leaving link 116 and going to electrical load 122 via VSC sub-system 104 preferably is equal to the power received by link 116. As used herein, "steady state" in the context of HVDC link 116 means when its operating voltage magnitude is in a range from +/−0.01% to +/−10%, preferably from +/−0.01% to +/−5%, more preferably from +/−0.01% to +/−0.1% of its nominal voltage rating (or rated voltage). For instance, referring to FIG. 2, a HVDC link for a wind turbine having a nominal voltage output of 690V by design choice has a rated voltage of 640 kV (determined to take into consideration power loss through transmission equipment and also a direct step-up relationship through the transformers). Steady state of the HVDC link in FIG. 2 is when its operating voltage magnitude is between from 640.2 kV to 639.8 kV. As used herein, "operating voltage" has its ordinary meaning, including the voltage at which the device or component is operating at an instant of time. And "rated voltage" has its ordinary meaning, including the voltage at which the device or component can be operated safely. One of ordinary skill knows how to determine the rated voltage of HVDC link 116 based on the specifications of equipment 108, including its nominal voltage output, and the rated voltage of the components supporting HVDC link 116.

In addition, if electrical network 10 experiences a shutdown, restoring power is potentially problematic because network 10 is not connected to an electric power grid. In particular, when electric power is available again after a shutdown, it is not desirable for equipment 108 to generate electric power at or near its power production threshold because that amount of electric power likely would cause a power surge that can overwhelm the equipment in network 10 and lead to equipment failure rather than bringing network 10 back to its steady state operation.

The present disclosure provides methods of using HVDC system 100 to provide electric power from renewable energy equipment 108 to electrical load 122, including restoring electric power flow to network 10 after it experiences a power outage (such as no or minimal availability of renewable energy like wind or solar) without using power from an electric power grid.

According to one aspect, the present disclosure provides a method for energizing HVDC system 100 to provide electric power from renewable energy equipment 108 to electrical load 122. As described herein, there is provided HVDC system 100 which comprises rectifier sub-system 102 and VSC sub-system 104. Rectifier sub-system 102 comprises at least one rectifier unit 116, an input (not numbered) electrically connected with renewable energy equipment 108, and an output (not numbered) electrically connected with VSC sub-system 104. As described, VSC sub-system 104 comprises at least one VSC 118, an input (not numbered) electrically connected with rectifier sub-system 102, and an output (not numbered) electrically connected with at least one electrical load 122.

Referring to FIG. 3, at block 302, HVDC system 100 and electrical load 122 need to be energized to begin operation, such as after a shutdown of network 10 due to a system failure or shutdown of equipment 108. The process to energize HVDC system 100 can be supported by an auxiliary system that initially energizes renewable energy equipment 108 to begin the electric power production. As shown in FIG. 1, because electrical load 122 is only connected to HVDC system 100 to receive its electric power, when HVDC link 116 is down, it is also without power and needs to be energized. Energizing HVDC link 116 includes providing electric power with suitable properties (such as voltage magnitude and phase angle) to energize electrical load 122. As used herein, "energize" or its grammatical equivalents means to provide electric power to a dormant equipment that does not have electricity flowing through it.

As shown in block 304, an initial voltage magnitude and phase angle for the electric power output of the renewable energy equipment 108 is determined based at least on the nominal voltage of renewable energy equipment 108 as described herein. At block 306, renewable energy equipment 108 is operated to function as a voltage source by generating electric power having the predetermined initial voltage magnitude and phase angle ($V_{(source)i}$ and $\theta_{(source)i}$, respectively) to energize rectifier sub-system 102 and HVDC link 116, thereby providing DC electric power to VSC sub-system 104. The renewable energy equipment 108 generates the electric power at a certain power production rate at any instant in time. A computer program or controller component of system 100 as described herein can be programmed to determine this initial voltage magnitude and phase angle based on the nominal output voltage of renewable energy equipment 108 as known by one of ordinary skill, including as described herein of at least taking into consideration at least the active power flow and reactive power flow to rectifier sub-system 102. The computer program or controller component can transmit the predetermined initial voltage magnitude and phase angle to the applicable component of renewable energy equipment 108 (such as an internal VSC of a wind turbine) for production of such electric power with the predetermined properties. The generated electric power is provided to rectifier sub-system 102 via transmission equipment 112 and 114 as noted herein, such as transformers and electrical lines. Rectifier sub-system 102, energized by the electric power from renewable energy equipment 108, converts the AC electric power input to HVDC electric power, thereby energizing HVDC link 116 and providing HVDC electric power to VSC sub-system 104. At block 308, an initial voltage magnitude for the AC electric power output of VSC sub-system 104 is preferably one that is capable of initiating electric power flow to electrical load 122 as can be determined by one of ordinary skill, at least as described herein. A computer program or controller component of system 100 as described herein can be programmed to determine this initial voltage magnitude. It is understood that the AC electric power output of VSC sub-system 104 also includes a phase angle in addition to the voltage magnitude. At block 310, VSC sub-system 104 is operated to function as a voltage source to energize one or more electrical loads 122 electrically connected to VSC sub-system 104 when VSC sub-system 104 provides the AC electric power output with the initial voltage magnitude to connected electrical load(s) 122 via transmission equipment 120, such as transformers and electrical lines as noted herein, thereby energizing electrical load 122.

At block 312, it is determined whether the power production rate of renewable energy equipment 108 is within a designated parameter. At block 314, if the answer is yes, then HVDC link 116 can be maintained in steady state against a power disparity caused by a change in electric power generated by renewable energy equipment 108, as further described in FIG. 5. If it is determined that the power production rate of renewable energy equipment 108 is not within a designated parameter, at block 314, renewable energy equipment 108 is operated to follow the properties of the AC electric power output of VSC sub-system 104 such that controlling the properties of the AC electric power output can control the power production rate of renewable energy equipment 108. That is, VSC sub-system 104 is the "master" and renewable energy equipment 108 is the "slave." Preferably, renewable energy equipment 108 can be placed in "slave" mode until the power production rate is within the designated parameter. One of ordinary skill would know how to employ a computer program or controller component of system 100 and/or the relevant component of renewable energy equipment 108 to achieve such master/ slave relationship.

FIG. 4 depicts an exemplary process flow to control the AC electric power output of VSC sub-system 104 to steer the power production rate be within a designated parameter, particularly depicting an option of implementing block 316 of FIG. 3 to operate renewable energy equipment 108 to follow the AC electric power output of VSC sub-system 104. At block 316A, VSC sub-system 104 is operated to provide AC electric power output having a new voltage magnitude selected based at least on a desired incremental change to the AC voltage output. Preferably, the desired incremental change can include an incremental increase or an incremental decrease to the AC voltage output of VSC sub-system 104 to eventually bring the operating AC voltage output of VSC sub-system 104 within a designated parameter, which is based at least on the nominal capacity (or nominal electrical consumption) of load 122 that are electrical consumers. For instance, if electrical load 122 consists essentially of one electrolyzer with a nominal capacity of 1 GW (10%-100%) per the equipment manufacturer, it can begin hydrogen production if provided with electric power having a voltage magnitude equivalent to that of 100 MW consumption, and its production can be increased to 100% as the voltage magnitude of the electric power increases. In this scenario, the voltage magnitude of the AC electric output of VSC sub-system 104 can be adjusted (with incremental increases and decreases to accommodate system fluctuations) until the voltage magnitude of the AC electric output of VSC sub-system 104 reaches a desired parameter, which can result 1 GW or some percentage of as desired (e.g, 90%-99%, etc.). It is understood designing a grid-independent electrical network such as network 10 preferably takes into consideration the desired electrical load or demands and/or desired renewable energy production nominal capacity, which can help in equipment selection and operating conditions.

At block 316A, the new voltage magnitude of the AC electric power output of VSC sub-system 104 is different from the initial voltage magnitude from block 308. For instance, the initial voltage magnitude can be considered $V_{(VSC)i}$, and the new voltage magnitude can be considered $V_{(VSC)1}$. The value of the new voltage magnitude can be determined based at least on a difference between an actual voltage output and a designated voltage output of VSC sub-system 104. In a preferred embodiment, the designated voltage output of VSC sub-system 104 is a user-defined value based on a nominal capacity value of electrical load 122 comprising an electrical consumer. The difference between the actual and designated AC voltage output values can be used to determine a suitable incremental change in AC voltage output value for VSC sub-system 104. For example, this difference can be an input to a closed-loop control system that provides as an output a voltage adjustment value (i.e., incremental change) for the AC electric power output of VSC sub-system 104 with a new voltage magnitude. It is understood that a computer program or controller component of system 100 can be programmed to execute these and other steps as described herein.

When VSC sub-system 104 starts to convert DC electric power to AC electric power with the new voltage magnitude, the electric power output leaving system 100 via VSC sub-system 104 no longer corresponds to the electric power input entering system 100 from renewable energy equipment 108. Such a power disparity is experienced by renewable energy equipment 108 when it is in the "slave" mode since the remaining components in system 100 are configured to maintain HVDC link 116 in steady state while in such mode. At block 316B, in response to at least the power disparity from block 316A, the power production of renewable equipment 108 is adjusted to restore power balance to renewable energy equipment 108. Preferably, the power balance of renewable energy equipment 108 is restored at least by operating renewable energy equipment 108 to generate electric power with a new voltage magnitude and phase angle ($V_{(source)1}$ and $\theta_{(source)1}$) that correspond to at least the new voltage magnitude ($V_{(VSC)1}$) of the AC electric power output of VSC sub-system 104. When renewable energy equipment 108 generates electric power with the new voltage magnitude and phase angle ($V_{(source)1}$ and $\theta_{(source)1}$), power balance is restored to equipment 108 and its power production rate has been changed accordingly to match the new AC voltage output of VSC sub-system 104.

The process can return to block 312 where if it is determined that the power production rate of renewable energy equipment 108 is not within a designated parameter, then the process goes back to block 316A in which VSC sub-system 104 is operated to provide AC electric power output having another new voltage magnitude configured to provide an incremental change to an amount of AC voltage output of VSC sub-system 104 as described herein. This other new voltage magnitude can be considered $V_{(VSC)2}$, which is different from the previous new voltage magnitude $V_{(VSC)1}$. The change to the properties of AC electric power output of VSC sub-system 104 introduces a power disparity to renewable energy equipment 108 which results in a corresponding change to the power production rate to generate electric power with a new voltage magnitude and phase angle ($V_{(source)2}$ and $\theta_{(source)2}$, respectively) to restore power balance to equipment 108 in block 316B.

As such, blocks 312 and 316 (including 316A and 316B) can be performed as a loop to control the power production rate of equipment 108 (including to direct the power production rate of renewable energy equipment 108 toward a designated parameter) by controlling the properties of the AC output of VSC sub-system 104 until the power production rate is within a designated parameter. Preferably, a designated parameter includes when the power production rate is within +/-10%, more preferably +/-5%, most preferably +/-1% of a power production threshold of renewable energy equipment 108. Preferably, the power production threshold is determined by maximum power point tracking (MPPT). It is understood that the designated parameter can be a design choice, such as any desired power production rate, and can be subject to certain system and operational restrictions as known to one of ordinary skills (such as accommodating for variability in the renewable energy source such as wind or solar). It is understood that the loop of blocks 312 and 316 (including 316A and 316B) can be used to generally increase power production rate of renewable energy equipment 108, which can include cycles where the voltage magnitude of the AC output of VSC sub-system 104 (and correspondingly the voltage magnitude of renewable energy equipment 108) decreases and increases according to operating conditions to accommodate for rapid achievement of steady state to the overall system 10.

At block 312, if it is determined that the power production rate is within the designated parameter, system 100 can be operated in steady state operation where HVDC link 116 is maintained in steady state against a power disparity caused at least by a change in the properties of the electric power generated by renewable energy equipment 108, such as further described with respect to FIG. 5.

In steady state operation of system 100, VSC sub-system 104 can be operated to be a "slave" and follow the electric power output of renewable energy equipment 108, which is now the "master." That is, if renewable energy equipment 108 has been operated as the "slave," it is instructed to stop following VSC sub-system 104 such that the power production rate is not influenced by a change in the AC electric output. As a "master," changes to the electric power generated by renewable energy equipment 108 (including changes to the voltage magnitude and/or phase angle) influence the AC electric output of VSC sub-system 104. For instance, in "slave" mode VSC sub-system 104 can be programmed to adjust the voltage magnitude and phase angle of its AC electric power output to correspond to the properties of the electric power generated by renewable energy equipment 108. The computer program or controller component of system 100, VSC sub-system 104, and/or the relevant component of renewable energy equipment 108 can be programmed, as known to one of ordinary skill, to carry out this arrangement of renewable energy equipment 108 functioning as the "master" and VSC sub-system 104 as the "slave" as described.

Referring to FIG. 5, at block 502, during steady state operation, the renewable energy equipment generates electric power that continues to power HDVC link 116 and provide DC electric power to the VSC sub-system. The generated electric power has a voltage magnitude and phase angle that maintain HVDC link 116 in steady state, $V_{(source)s}$ and $\theta_{(source)s}$, respectively. As understood by one of ordinary skill, changes to the properties of electric power generated by renewable energy equipment 108 can be driven at least by a change of active power input from the dynamic nature of renewable energy equipment for voltage magnitude, such as aerodynamic torque input from the wind force if equipment 108 includes wind turbines, and at least by re-distribution of reactive power across all applicable units of renewable energy equipment for phase angle. At block 504, the status of HVDC link 116 is monitored to detect a power disparity in HVDC link 116 caused at least by a change in the voltage magnitude and phase angle of the electric power generated by the renewable energy equipment. Suitable systems and methods to monitor the status of HVDC link 116 and detect such power disparity are known to one of ordinary skill.

When renewable energy equipment 108 generates electric power with a new voltage magnitude and phase angle, $V_{(source)new}$ and $\theta_{(source)new}$, where if the change is significant enough, it can cause HDVC link 116 to deviate from steady state. This can happen when the electric power output leaving system 100 via VSC sub-system 104 no longer corresponds to the electric power input entering system 100 from renewable energy equipment 108. Such a power disparity is experienced by HVDC link 116 when VSC sub-system 104 is in the "slave" mode. This is in contrast with when renewable energy equipment 108 is in "slave" mode. The amount of the power disparity experienced by HVDC link 116 above a certain threshold can cause a deviation from steady state for HVDC link 116.

At block 506, if a deviation from steady state caused at least by a change in the voltage magnitude and phase angle of the electric power generated by renewable energy equipment 108 has been detected, steady state of HVDC link 116 is restored at block 508. If HVDC link continues to be in steady state, no action is needed. It is understood that the system can be programmed to perform the monitoring step as desired, including its relation to whether or not the process proceeds to block 508.

At block 508, if the deviation has been detected at block 506, steady state of HVDC link 116 is restored by identifying a change in the voltage magnitude and phase angle of the electric power generated by renewable energy equipment 108 that resulted in the deviation at block 510. At block 512, the voltage magnitude of the AC electric power output of VSC sub-system 104 is adjusted in response to the identified change, thereby restoring HVDC link 116 to steady state. That is, VSC sub-system 104 is operated to provide AC electric power output having a new voltage magnitude ($V_{(VSC)new}$) that corresponds to the new voltage magnitude and phase angle of renewable energy equipment 108 ($V_{(source)new}$ and $\theta_{(source)new}$).

Optionally and preferably, the status of HVDC link 116 is continuously monitored. More preferably, the continuously monitoring comprises checking the status of HVDC link 116 at a time interval of less than 1 second, preferably less than 0.01 second, and more preferably equal to or less than 1 millisecond (ms), such as in a range from 1 microsecond ($\mu$s) to 1 second, preferably from 10 $\mu$s to 0.01 second, and more preferably from 50 $\mu$s to 1 ms. Under such continuous monitoring, when HVDC link 116 is restored to steady state at block 508, the new voltage magnitude and phase angle of renewable energy equipment 108 ($V_{(source)new}$ and $\theta_{(source)new}$) becomes the new steady state voltage magnitude and phase angle against which a change is identified at block 510 to restore HVDC link 116 to steady state again.

The process depicted in FIG. 5 and described herein can be useful to maintain HVDC system 100 in steady state in circumstances where fluctuations in the voltage magnitude and phase angle equipment 108 generates electricity from a variable renewable energy source such as wind or solar.

As described, the methods provided herein address challenges associated with providing electric power from a renewable energy equipment directly to an electrical consumer, particularly one that has a large annual energy consumption for its operation, such as in the GW range and one that receives its power from only the renewable energy equipment rather than being alternatively or additionally connected to a utility power grid for its power supply. In particular, the methods described with respect to FIGS. 3 and 4 enable black-starting of an HVDC link with electric power from the renewable energy equipment and transmit that electric power to black-start a connected electric consumer. Further, the methods described with respect to FIGS. 3 and 4 allow for the control of the power production rate of the renewable energy equipment to bring it within a designated parameter, preferably its power production threshold, to maximize the rate of energy that can be produced at a given instant. The methods described with respect to FIG. 5 allow for the steady state of the HVDC link to be maintained even when the system experiences a power disparity caused at least by the potential variable power production which can bring the HVDC link out of steady state. Maintaining the HVDC link in steady state also helps ensure the steady supply of electric power to the electric consumer from the renewable energy equipment. As can be seen, the systems and methods described in the Specification section, including all described features and embodiments, achieve the objectives and/or benefits described in the Summary section.

While specific embodiments have been described herein, it is understood that such descriptions are not intended to limit the described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

We claim:

1. A method for providing electric power from a renewable energy equipment (108) to an electrical load (122), the method comprises:

(a) providing an HVDC system (100) comprising an AC/DC converter sub-system (102) and a VSC sub-system (104), wherein the AC/DC converter sub-system comprises at least one AC/DC converter unit (106), an input electrically connected with the renewable energy equipment (108), and an output electrically connected with the VSC sub-system (104), and wherein the VSC sub-system comprises at least one VSC (118), an input electrically connected with the AC/DC converter sub-system (102), and an output electrically connected with at least one electrical load (122);

(b) determining an initial voltage magnitude and phase angle for electric power to be generated by the renewable energy equipment (108);

(c) operating the renewable energy equipment (108) to generate electric power having the predetermined initial voltage magnitude and phase angle from step (b) to energize an HVDC link (116) between the AC/DC converter sub-system (102) and the VSC sub-system (104), thereby providing DC electric power to the VSC sub-system (104), wherein the renewable energy equipment (108) generates the electric power at a power production rate;

(d) operating the VSC sub-system (104) to convert the DC electric power to AC electric power output to energize the at least one electrical load (122), wherein the AC electric power output comprises an initial voltage magnitude;

(e) determining whether the power production rate of the renewable energy equipment is within a designated parameter, and if an outcome of the determination is a "no," operating the renewable energy equipment to follow the VSC sub-system such that controlling the AC electric power output of the VSC sub-system (104) influences the power production rate of the renewal energy equipment (108);

(f) changing the AC electric power output of the VSC sub-system (104), thereby introducing a power disparity to the renewable energy equipment (108);

(g) in response to at least the power disparity from step (f), adjusting the power production rate of the renewable energy equipment (108) to restore power balance to the renewable energy equipment (108); and (h) repeating steps (e) through (g) until it is determined that the power production rate of the renewable energy equipment (108) is within the designated parameter.

2. The method of claim 1, wherein step (f) comprises operating the VSC sub-system (104) to provide AC electric power output comprising a new voltage magnitude selected based at least on a desired incremental change to the AC voltage output; and wherein step (g) comprises operating the renewable energy equipment (108) to generate electric power with a new voltage magnitude and phase angle that correspond to the new voltage magnitude of the VSC sub-system (104) from step (f) to restore power balance to the renewable energy equipment (108).

3. The method of claim 2, wherein the desired incremental change is determined based at least on a difference between an actual AC voltage output and a designated AC voltage output of the VSC sub-system.

4. The method of claim 1, further comprising:

(i) upon determining that the power production rate of the renewable energy equipment (108) is within the designated parameter, operating the VSC sub-system (104) to follow the renewable energy equipment (108) such that a change in electric power generated by renewable energy equipment (108) influences the AC electric power output of the VSC sub-system (104); and (j) maintaining the HVDC link in steady state in response to a detected power disparity in the HVDC link caused at least by a change in the electric power generated by the renewable energy equipment by operating the VSC sub-system (104) to adjust voltage magnitude of its AC electric power output to correspond to the electric power generated by the renewable energy equipment (108).

5. The method of claim 4, wherein step (j) comprises identifying a change in the voltage magnitude and phase angle of the electric power generated by the renewable energy equipment causing the detected power disparity; and adjusting the AC electric power output of the VSC sub-system (104) to restore the HDVC link (116) to steady state by operating the VSC sub-system (104) to provide AC electric power output comprising a new voltage magnitude based on the identified change.

6. The method of claim 1, wherein the designated parameter is in a range from −10% to +10% of a power production threshold of the renewable energy equipment.

7. The method of claim 6, wherein the power production threshold is determined by maximum power point tracking (MPPT).

8. A method for controlling an HVDC system to provide electric power from a renewable energy equipment to an electrical load the method comprising:

(a) providing an HVDC system (100) comprising an AC/DC converter sub-system (102) and a VSC sub-system (104), wherein the AC/DC converter sub-system comprises at least one AC/DC converter unit (106), an input electrically connected with the renewable energy equipment (108), and an output electrically connected with the VSC sub-system (104), and wherein the VSC sub-system comprises at least one VSC (118), an input electrically connected with the AC/DC converter sub-system (102), and an output electrically connected with at least one electrical load (122); and (b) operating the renewable energy equipment (108) to generate electric power having a voltage magnitude and phase angle that maintain a HDVC link (116) in steady state and provide DC electric power to the VSC sub-system (104);

(c) operating the VSC sub-system (104) to convert the DC electric power to AC electric power output to provide to at least one electrical load (122), wherein the AC electric power output comprises a first voltage magnitude;

(d) monitoring status of the HVDC link (116) to detect a deviation from steady state caused at least by a change in the voltage magnitude and phase angle of the electric power generated by the renewable energy equipment (108); and (e) upon detecting the deviation, restoring the HVDC link (116) to steady state, wherein the restoring step comprises identifying the change from step (d), and operating the VSC sub-system (104) to convert the DC electric power to AC electric power output comprising a new voltage magnitude selected based on the identified change.

9. The method of claim 8, wherein step (d) comprises continuously monitoring wherein the status of the HVDC link is continuously monitored at a time interval of less than 1 second.

10. The method of claim 1, wherein the HVDC link is in steady state when its operating voltage magnitude is in a range from +/−0.01% to +/−10% of its nominal voltage rating.

11. The method of claim 1, wherein the at least one electrical load is one or more electrical consumers.

12. The method of claim 11, wherein the one or more electrical consumers comprises an electrolyzer with a nominal capacity of at least 10 Megawatts (MW).

13. The method of claim 12, wherein the electrolyzer does not receive electric power from a utility power grid to generate hydrogen.

14. The method of claim 1, wherein the AC/DC converter subsystem (102) is a rectifier sub-system comprising at least one rectifier unit.

15. The method of claim 14, wherein the rectifier sub-system comprises a plurality of rectifier units connected in series and/or the VSC sub-system comprises a plurality of VSCs connected in series.

* * * * *